United States Patent
Inoue et al.

(10) Patent No.: US 8,279,738 B2
(45) Date of Patent: Oct. 2, 2012

(54) OBJECTIVE LENS AND OPTICAL INFORMATION RECORDING/REPRODUCING DEVICE HAVING THE SAME

(75) Inventors: Satoshi Inoue, Saitama (JP); Daisuke Koreeda, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 762 days.

(21) Appl. No.: 12/330,861

(22) Filed: Dec. 9, 2008

(65) Prior Publication Data
US 2009/0154325 A1     Jun. 18, 2009

(30) Foreign Application Priority Data
Dec. 12, 2007 (JP) ................................ 2007-320829

(51) Int. Cl.
  *G11B 7/00*    (2006.01)
  *G11B 7/135*   (2006.01)
  *G02B 23/24*   (2006.01)
(52) U.S. Cl. ............... 369/112.11; 369/112.23; 359/362
(58) Field of Classification Search ............... None
  See application file for complete search history.

(56) References Cited

U.S. PATENT DOCUMENTS

| | | | |
|---|---|---|---|
| 6,807,019 B2 | 10/2004 | Takeuchi et al. | |
| 6,870,805 B1 | 3/2005 | Arai et al. | |
| 7,738,345 B2 | 6/2010 | Koreeda et al. | |
| 2004/0047269 A1* | 3/2004 | Ikenaka et al. | 369/112.08 |
| 2005/0122882 A1 | 6/2005 | Kimura | |
| 2006/0114796 A1 | 6/2006 | Maruyama et al. | |
| 2006/0280061 A1 | 12/2006 | Koreeda et al. | |
| 2007/0014211 A1 | 1/2007 | Koreeda et al. | |
| 2007/0070860 A1 | 3/2007 | Koreeda et al. | |
| 2007/0237039 A1 | 10/2007 | Takeuchi | |
| 2007/0297314 A1 | 12/2007 | Koreeda et al. | |
| 2008/0089207 A1 | 4/2008 | Koreeda et al. | |
| 2008/0130465 A1 | 6/2008 | Koreeda et al. | |
| 2008/0165436 A1 | 7/2008 | Koreeda et al. | |
| 2008/0259775 A1 | 10/2008 | Yamagata et al. | |

FOREIGN PATENT DOCUMENTS

CN      1896773      1/2007
(Continued)

OTHER PUBLICATIONS

Japan Office action, dated Dec. 14, 2011 along with an english translation thereof.
(Continued)

*Primary Examiner* — Mohammad Ghayour
*Assistant Examiner* — Carl Adams
(74) *Attorney, Agent, or Firm* — Greenblum & Bernstein, P.L.C.

(57) ABSTRACT

There is provided an objective lens for information recording/reproducing for three types of optical discs, which includes a first area contributing to converging a third light beam onto a record surface of a third optical disc. The first area includes a phase shift structure having refractive surface zones concentrically formed about a predetermined axis. The phase shift structure includes first and second step groups. The first step group is configured such that an optical path length difference $\Delta OPD_1$ (nm) given by each step of the first step group to a first light beam satisfies a condition: $2N_1+1.10<|\Delta OPD_1/\lambda 1|<2N_1+1.40$, where $N_1$ is an integer or zero, and the second step group is configured such that an optical path length difference $\Delta OPD_2$ (nm) given by each step of the second step group to the first light beam satisfies a condition: $2N_2-0.10<|\Delta OPD_2/\lambda 1|<2N_2+0.10$, where $N_2$ is an integer.

13 Claims, 4 Drawing Sheets

FOREIGN PATENT DOCUMENTS

| | | |
|---|---|---|
| JP | 2001-195769 | 7/2001 |
| JP | 2006-164498 | 6/2006 |
| JP | 2006-185576 | 7/2006 |
| JP | 2007-4962 | 1/2007 |
| JP | 2007-048426 | 2/2007 |

OTHER PUBLICATIONS

China Office action, dated Jan. 5, 2012 along with an english translation thereof.

Chinese Office Action, dated Jun. 27, 2012 along with an English translation thereof.

* cited by examiner

OBJECTIVE LENS AND OPTICAL INFORMATION RECORDING/REPRODUCING DEVICE HAVING THE SAME

BACKGROUND OF THE INVENTION

The present invention relates to an objective lens which is installed in an optical information recording/reproducing device for recording information to and/or reproducing information from multiple types of optical discs differing in recording density.

There exist various standards of optical discs (CD, DVD, etc.) differing in recording density, protective layer thickness, etc. Meanwhile, new-standard optical discs (HD DVD (High-Definition DVD), BD (Blu-ray Disc), etc.), having still higher recording density than DVD, are being brought into practical use in recent years to realize still higher information storage capacity. The protective layer thickness of such a new-standard optical disc is substantially equal to or less than that of DVD. In consideration of user convenience with such optical discs according to multiple standards, the optical information recording/reproducing devices (more specifically, objective optical systems installed in the devices) of recent years are required to have compatibility with the above three types of optical discs. Incidentally, in this specification, the "optical information recording/reproducing devices" include devices for both information reproducing and information recording, devices exclusively for information reproducing, and devices exclusively for information recording. The above "compatibility" means that the optical information recording/reproducing device ensures the information reproducing and/or information recording with no need of component replacement even when the optical disc being used is switched.

In order to provide an optical information recording/reproducing device having the compatibility with optical discs of multiple standards, the device has to be configured to be capable of forming a beam spot suitable for a particular recording density of an optical disc being used, by changing a NA (Numerical Aperture) of an objective optical system used for information reproducing/registering, while also correcting spherical aberration which varies depending on the protective layer thickness changed by switching between optical discs of different standards. Since the diameter of the beam spot can generally be made smaller as the wavelength of the beam gets shorter, multiple laser beams having different wavelengths are selectively used by the optical information recording/reproducing device depending on the recording density of the optical disc being used. For example, for DVDs, a laser beam with a wavelength of approximately 660 nm shorter than approximately 790 nm for CDs is used. For the aforementioned new-standard optical discs, a laser beam with a wavelength still (e.g. so-called "blue laser" around 408 nm) shorter than that for DVDs is used in order to deal with the extra-high recording density.

In recent years, a technology for suitably converging a light beam onto a record surface of an optical disc being used by providing an annular zone structure for an at least one optical element (e.g., an objective lens) of an objective optical system has been brought into practical use. More specifically, the annular zone structure formed on a surface of the optical element is configured to have a plurality of annular zones divided by minute steps. Through the function of the annular zone structure, each of the multiple types of light beams having different wavelengths is suitably converged onto the record surface of each of the optical discs of different standards.

It is preferable that, the above described optical element has a function of correcting the spherical aberration caused when the wavelength of the laser beam being used shifts from a design wavelength due to individual differences between light sources or environmental variations, such as temperature variations. The term "design wavelength" means an optimum wavelength for recording and/or reproducing for each of the optical discs of different standards.

An example of the objective optical system having the compatibility with the three types of optical discs (e.g., CD, DVD and HD-DVD) is disclosed in Japanese Patent Provisional Publication No. 2007-4962A (hereafter, referred to as JP2007-4962A). The objective optical system disclosed in JP2007-4962A has a phase shift structure designed to achieve a high use efficiency of light when an optical disc of the new-standard, such as HD-DVD, is used. In addition, the objective optical system is configured to prevent decrease of the S/N ratio of a focus error signal caused by undesired diffraction order light (i.e., flare light) during use of CD by controlling the longitudinal chromatic aberration during use of CD. The term "use efficiency of light" in this specification means a ratio of the light amount defined on a record surface of an optical disc being used with respect to the amount of light emitted from a light source.

The term "undesired diffraction order light" means light of a diffraction order not used for the information recording and the information reproducing. On the other hand, "normal diffraction order light" means light of a diffraction order used for the information recording and the information reproducing.

It is not necessarily required to increase the use efficiency of light for the new-standard optical disc to a considerably high level at the expense of the use efficiency of light for the other types of optical discs. In other words, it is possible to design an objective optical system having the compatibility with the three types of optical discs (e.g., CD, DVD and the new-standard optical disc) based on a design concept different from that of JP2007-4962A. For example, in order to ensure the stability of the recording function or the reproducing function for an optical disc having a relatively low recording density, such as CD, a designer may increase the use efficiency of light for CD to a certain extent.

However, increasing the user efficiency of light for CD leads to occurrence of the undesired diffraction order light during use of the new-standard disc and decrease of the S/N ratio of the focus error signal. As in the case of the objective optical system disclosed in JP2007-4962A, it is possible to prevent decreasing of the S/N ratio of the focus error signal by finely adjusting a convergence point of the undesired order diffraction light. However, it should be noted that the new-standard optical disc may have a multilayer structure formed of a multiple record layers. Therefore, if an objective optical system is designed simply based on the design concept of JP2007-4962A, the undesired diffraction order light may converge onto a record layer positioned near a record layer onto which the normal diffraction order light converges. In this case, the focus error signal may be badly affected.

SUMMARY OF THE INVENTION

The present invention is advantageous in that it provides at least one of an objective lens and an optical information recording/reproducing device configured to have compatibility with multiple types of optical discs of different standards by forming a suitable beam spot on a record surface of each optical disc while suppressing the spherical aberration, to enhance use efficiency of light for an optical disc (e.g., CD)

having a relatively low recording density, and to suitably suppress occurrence of the longitudinal chromatic aberration even when an optical disc having a high recording density, such a HD DVD, is used, while maintaining the S/N ratio of a focus error signal at a high level.

According to an aspect of the invention, there is provided an objective lens used for an optical information recording/reproducing device for recording information to and/or reproducing information from three types of optical discs, by selectively using one of three types of light beams including a first light beam having a first wavelength $\lambda_1$ (nm), a second light beam having a second wavelength $\lambda_2$ (nm) and a third light beam having a third wavelength $\lambda_3$ (nm). The at least three types of optical discs includes a first optical disc for which information recording or information reproducing is executed by using the first light beam, a second optical disc for which information recording or information reproducing is executed by using the second light beam, and a third optical disc for which information recording or information reproducing is executed by using the third light beam. The first, second and third wavelengths $\lambda_1$, $\lambda_2$ and $\lambda_3$ satisfy a condition ($\lambda_1 < \lambda_2 < \lambda_3$). The objective lens includes a first area contributing to converging the third light beam onto a record surface of the third optical disc. The first area includes a phase shift structure having a plurality of refractive surface zones concentrically formed about a predetermined axis. The phase shift structure includes a first step group and a second step group.

In this configuration, an optical path length difference given by the first step group to an incident light beam between adjacent refractive surface zones in the first step group is different from an optical path length difference given by the second step group to the incident light beam between adjacent refractive surface zones in the second step group. Positions of steps formed in the first and second step groups are defined by first and second optical path difference functions, respectively. An i-th optical path difference function $\phi_i(h)$ is expressed by:

$$\phi_i(h) = (P_{i2}h^2 + P_{i4}h^4 + P_{i6}h^6 + P_{i8}h^8 + P_{i10}h^{10} + P_{i12}h^{12})m_i\lambda$$

where $P_{i2}$, $P_{i4}$, $P_{i6}$ ... (i: natural number) represents coefficients of the $2^{nd}$ order, $4^{th}$ order, $6^{th}$ order, ... of the i-th optical path difference function, h represents a height from an optical axis, $m_i$ represents a diffraction order at which diffraction efficiency is maximized, and $\lambda$ represents a design wavelength of the incident light beam. The $2^{nd}$ order coefficient $P_{12}$ for a first optical path difference function $\phi_1(h)$ is a positive value. The $2^{nd}$ order coefficient $P_{22}$ of a second optical path difference function $\phi_2(h)$ is a negative value. The first step group is configured such that an optical path length difference $\Delta OPD_1$ (nm) given by each step of the first step group to the first light beam satisfies a condition:

$$2N_1 + 1.10 < |\Delta OPD_1/\lambda 1| < 2N_1 + 1.40 \tag{1}$$

where $N_1$ is an integer or zero.

The second step group is configured such that an optical path length difference $\Delta OPD_2$ (nm) given by each step of the second step group to the first light beam satisfies a condition:

$$2N_2 - 0.10 < |\Delta OPD_2/\lambda 1| < 2N_2 + 0.10 \tag{2}$$

where $N_2$ is an integer.

With this configuration, it is possible to maintain use efficiency of light at a high level for each of the first, second and third optical discs. By setting the $2^{nd}$ order coefficients of the first and second optical path difference functions as indicated above, it is possible to suitably suppress occurrence of the longitudinal chromatic aberration when the first optical disc is used. Further, it is possible to decrease the amount of undesired diffraction order light and thereby to prevent deterioration of a waveform of a focus error signal.

According to another aspect of the invention, there is provided an optical information recording/reproducing device for recording information to and/or reproducing information from three types of optical discs, by selectively using one of three types of light beams including a first light beam having a first wavelength $\lambda_1$ (nm), a second light beam having a second wavelength $\lambda_2$ (nm) and a third light beam having a third wavelength $\lambda_3$ (nm). The at least three types of optical discs includes a first optical disc for which information recording or information reproducing is executed by using the first light beam, a second optical disc for which information recording or information reproducing is executed by using the second light beam, and a third optical disc for which information recording or information reproducing is executed by using the third light beam. The first, second and third wavelengths $\lambda_1$, $\lambda_2$ and $\lambda_3$ satisfy a condition ($\lambda_1 < \lambda_2 < \lambda_3$). When numerical apertures required for information reproducing or information recording on the first, second and third optical discs are defined as NA1, NA2 and NA3, respectively, the numerical apertures satisfy relationships (NA1>NA3); and (NA2>NA3). When protective layer thicknesses of the first, second and third optical discs are represented by t1 (mm), t2 (mm) and t3 (mm), respectively, the protective layer thicknesses are t1≈0.6 mm, t2≈0.6 mm and t3≈1.2 mm. The optical information recording/reproducing device includes light sources respectively emitting the first, second and third light beams; and the above described objective lens. In this configuration, each of the first, second and third light beams is incident on the objective lens as a collimated beam.

With this configuration, it is possible to maintain use efficiency of light at a high level for each of the first, second and third optical discs. By setting the $2^{nd}$ order coefficients of the first and second optical path difference functions as indicated above, it is possible to suitably suppress occurrence of the longitudinal chromatic aberration when the first optical disc is used. Further, it is possible to decrease the amount of undesired diffraction order light and thereby to prevent deterioration of a waveform of a focus error signal.

In at least one aspect, the first step group is configured to satisfy a condition:

$$0.0 < f1 \times P_{12} < 23.0 \tag{3}$$

wherein f1 (mm) represents a focal length of the objective lens with respect to the first light beam.

In at least one aspect, the second step group is configured to satisfy a condition:

$$-35.0 < f1 \times P_{22} < 0.0 \tag{4}$$

In at least one aspect, the objective lens satisfies a condition:

$$-15.0 < f1 \times (m_1 \times P_{12} + m_2 \times P_{22}) < 30.0 \tag{5}$$

In at least one aspect, the objective lens satisfies a condition:

$$-10.0 < f1 \times (m_1 \times P_{12} + m_2 \times P_{22}) < 20.0 \tag{6}$$

In at least one aspect, N1=1 and N2=1 are satisfied.

In at least one aspect, the objective lens includes a second area located outside the first area. The second area contribute to converging the first and second light beams onto record surfaces of the first and second optical discs, respectively, and does not contribute to converge the third light beam onto the record surface of the third optical disc.

DETAILED DESCRIPTION OF THE EMBODIMENTS

Hereinafter, an embodiment according to the invention is described with reference to the accompanying drawings.

In the following, an objective lens 10 according to the embodiment, and an optical information recording/reproducing device 100 on which the objective lens 10 is mounted are described (see FIG. 1).

In the following explanation, an optical disc of a type (one of the three types) having the highest recording density (e.g. a new-standard optical disc such as HD DVD or BD) will be referred to as an "optical disc D1", an optical disc of a type having a relatively low recording density compared to the optical disc D1 (DVD, DVD-R, etc.) will be referred to as an "optical disc D2", and an optical disc of a type having the lowest recording density (CD, CD-R, etc.) will be referred to as an "optical disc D3" for convenience of explanation.

If the protective layer thicknesses of the optical discs D1-D3 are defined as t1, t2, t3, respectively, the protective layer thicknesses are defined as follows.

t1=0.6 mm t2=0.6 mm t3=1.2 mm

In order to carry out the information reproducing/recording on each of the optical discs D1-D3, the NA (Numerical Aperture) required for the information reproducing/recording has to be varied properly so that a beam spot suitable for the particular recording density of each optical disc can be formed. When the optimum design numerical apertures required for the information reproducing/recording on the three types of optical discs D1, D2 and D3 are defined as NA1, NA2 and NA3, respectively, the numerical apertures (NA1, NA2, NA3) satisfy the following relationships.

(NA1>NA3) and (NA2>NA3)

Specifically, for the information recording/reproducing on the optical discs D1 and D2 having high recording densities, a relatively large NA is required since a relatively small spot has to be formed. On the other hand, for the information recording/reproducing on the optical disc D3 having the lowest recording density, the required NA is relatively small. Incidentally, each optical disc is set on a turntable (not shown) and rotated at high speed when the information recording/reproducing is carried out.

In cases where three types of optical discs D1-D3 (having different recording densities) are used as above, multiple laser beams having different wavelengths are selectively used by the optical information recording/reproducing device so that a beam spot suitable for each recording density can be formed on the record surface of the optical disc being used.

Specifically, for the information recording/reproducing on the optical disc D1, a "first laser beam" having the shortest wavelength is emitted from a light source so as to form the smallest beam spot on the record surface of the optical disc D1. On the other hand, for the information recording/reproducing on the optical disc D3, a "third laser beam" having the longest wavelength is emitted from a light source so as to form the largest beam spot on the record surface of the optical disc D3. For the information recording/reproducing on the optical disc D2, a "second laser beam" having a wavelength longer than that of the first laser beam and shorter than that of the third laser beam is emitted from a light source so as to form a relatively small beam spot on the record surface of the optical disc D2.

Figure 1:
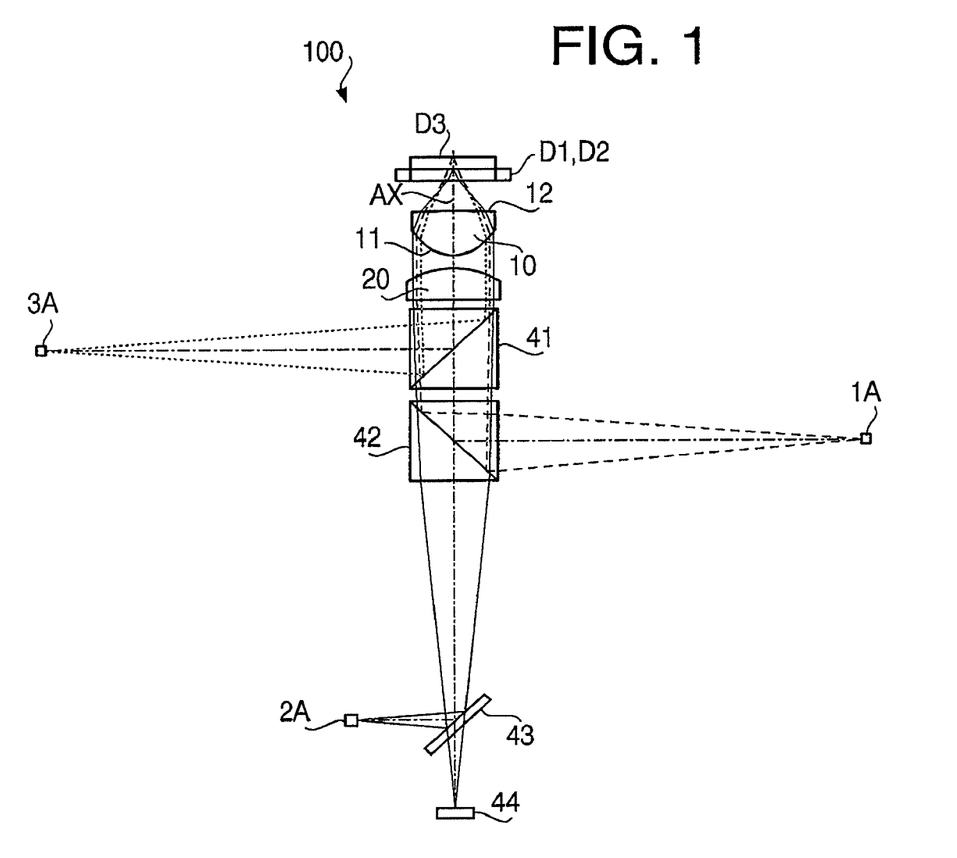
FIG. 1 is an optical block diagram of an optical information recording/reproducing device according to an embodiment.

FIG. 1 is an optical block diagram of the optical information recording/reproducing device 100. The optical information recording/reproducing device 100 includes a light source 1A which emits the first laser beam, a light source 2A which emits the second laser beam, a light source 3A which emits the third laser beam, a collimator lens 20, the objective lens 10 forming an objective optical system, beam splitters 41 and 42, a half mirror 43, and a photoreceptor 44.

As described above, the required NA varies depending on the type of the optical disc being used. Therefore, the optical information recording/reproducing device 100 may be provided with an aperture stop 60 adjusting the beam diameter of the third laser beam along an optical path from the light source 3A to the objective lens 10 as shown in FIG. 2A.

Figure 2A:
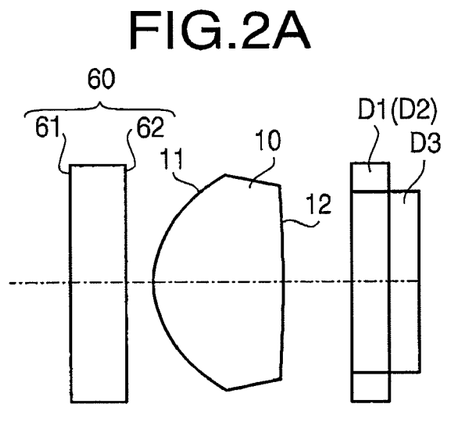
FIG. 2A illustrates an example of an optical configuration where an aperture stop is provided on a front side of an objective lens.
Figure 2B:
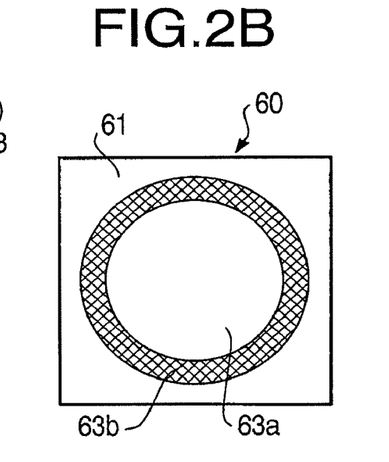
FIG. 2B is a front view of the aperture stop viewed from the side of a first surface.

FIG. 2A illustrates an example of an optical configuration where the aperture stop 60 is provided on the front side of the objective lens 10. As shown in FIG. 2A, the aperture stop 60 has a first surface 61 and a second surface 62 provided in this order form the light source side. FIG. 2B is a front view of the aperture stop 60 viewed from the side of the first surface 61. As shown in FIG. 2B, the first surface 61 includes first and second transparent areas 63a and 63b separated with respect to each other at a concentric boundary. The first transparent area 63a has a property of allowing each of the first to third laser beams to pass therethrough. The second transparent area 63b has a property of allowing only the first and second laser beams to pass therethrough while blocking the third laser beam.

When the aperture stop 60 is viewed from the side of the second surface 62, the same condition as that shown in FIG. 2B is observed.

By employing the aperture stop 60, it is possible to reduce the beam diameter of the third laser beam to a predetermined diameter. That is, it is possible to form a beam spot having a required diameter on the optical disc D3.

In order to perform the information recording or the information producing for the optical discs D1-D3, each of the first and second laser beams emitted by the light sources 1A and 2A is directed to a common optical path through the beam splitters 42 and 41, and the third laser beam emitted by the light source 3A is directed to the common optical path through the beam splitter 41. Then, each of the first to third laser beams is collimated by the collimator lens 20. Each laser beam passed through the collimator lens 20 enters the objective lens 10.

A reference axis AX of the optical information recording/reproducing device 100 is indicated by a chain line in FIG. 1. Although in FIG. 1 an optical axis of the objective lens 10 coincides with the reference axis AX, there is a case where the optical axis of the objective lens 10 shifts from the reference axis AX, for example, by a tracking operation during execution of the information recording or the information reproducing.

By thus converging each of the first to third laser beams entering the objective lens 10 into the collimated beam, it is possible to prevent occurrence of off-axis aberrations, such as a coma, in a state where the objective lens 10 is shifted from the reference axis AX for the tracking operation.

The laser beam passed through the objective lens 10 converges at a point near the record surface of the optical disc being used. The record surface of each of the optical disc D1-D3 is sandwiched between a protective layer and a label layer.

The laser beam reflected from the optical disc being used proceeds along the same common optical path, and is detected by the photoreceptor 44 after passing through the beam splitters 41 and 42 and the half mirror 43.

As described above, when the laser beams having different wavelengths are selectively used for the optical disc D1-D3, the spherical aberration changes depending on the difference of the protective layer thickness between the optical disc D1-D3 or change in refractive index of the objective lens 10.

Therefore, the objective lens 10 is configured to provide the compatibility with the three types of the optical disc D1-D3 by correcting the spherical aberration for each of the optical discs D1-D3. In order to achieve such optical performance, the objective lens 10 is provided with the following feature.

As shown in FIG. 1, the objective lens 10 has a surface 11 and a surface 12 provided in this order from the light source side. The objective lens 10 is a biconvex single-element lens made of plastic. Each of the surfaces 11 and 12 of the objective lens 10 is an aspherical surface.

A shape of an aspherical surface is expressed by a following equation:

$$X(h) = \frac{ch^2}{1+\sqrt{1-(1+K)c^2h^2}} + \sum_{j=2} A_{2j}h^{2j}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_{2j}$ (j; an integer larger than or equal to 2) represents an aspherical coefficient of $4^{th}$ order, $6^{th}$ order, $8^{th}$ order, $10^{th}$ order $_{12}{}^{th}$ order . . . .

At least one of the surfaces 11 and 12 of the objective lens 10 is provided with a phase shift structure having a plurality of refractive surface zones (annular zones) concentrically formed about the optical axis. The plurality of annular zones are divided by minute steps formed between adjacent ones of the plurality of annular zones. In this embodiment, the annular zone structure is formed on the surface 11.

The steps in the phase shift structure are classified into a plurality of step groups which give optical path length differences different from each other to an incident beam. In this embodiment, the phase shift structure of the objective lens 10 includes two types of step groups (first and second step groups).

More specifically, the first step group is configured such that an optical path length difference $\Delta OPD_1$ given by each step of the first step group to the first laser beam satisfies a condition:

$$2N_1+1.10<|\Delta OPD_1/\lambda 1|<2N_1+1.40 \qquad (1)$$

where $N_1$ is a natural number or zero.

The condition (1) is a condition for enhancing the use efficiency of light for the optical disc D3. If the intermediate term ($|\Delta OPD_1/\lambda 1|$) of the condition (1) defined for the first step group gets lower than or equal to the lower limit of the condition (1), the use efficiency of light for the optical disc D3 becomes lower than approximately 50%. If the intermediate term of the condition (1) defined for the first step group gets larger than or equal to the upper limit of the condition (1), the use efficiency of light for the optical disc D1 becomes lower than approximately 70%. The optical path length difference (e.g., $\Delta OPD_1$) means a distance defined in the direction of the optical axis of the objective lens 10. When the phase shift structure (i.e., annular zones) is formed on a curved surface, the heights of steps do not have a constant value (i.e., the height of each step is not constant) so as to give a constant optical path length difference.

As described above, if the condition (1) is not satisfied, it becomes impossible to secure an adequate amount of light for information recording and information producing for each of the optical disc D1 and D3. In such a case, steady information recording/reproducing can not be achieved.

The second step group is configured such that an optical path length difference $\Delta OPD_2$ given by each step of the second step group to the first laser beam satisfies a condition:

$$2N_2-0.10<|\Delta OPD_2/\lambda 1|<2N_2+0.10 \qquad (2)$$

where $N_2$ is an integer.

The condition (2) is a condition for enhancing the use efficiency of light for each of the optical discs D1 and D2. If the intermediate term ($|\Delta OPD_2/\lambda 1|$) of the condition (2) defined for the second step group gets lower than or equal to the lower limit of the condition (2), the use efficiency of light for the optical disc D1 becomes lower than approximately 95%. If the intermediate term of the condition (2) defined for the second step group gets larger than or equal to the upper limit of the condition (2), the use efficiency of light for the optical disc D2 becomes lower than approximately 85%.

As described above, if the condition (2) is not satisfied, it becomes impossible to secure an adequate amount of light for information recording and information reproducing for each of the optical disc D1 and D2. In such a case, steady information recording/reproducing can not be achieved.

In the following, design of the phase shift structure having the plurality of types of step groups is explained.

First, a plurality of types of optical path difference functions are calculated such that regarding a ratio between diffraction orders at which the diffraction efficiencies of the first to third laser beams take respective maximum values (hereafter, simply referred to as a "diffraction order ratio"), the plurality of types of optical path difference functions have diffraction order ratios different from each other. In this embodiment, two types of optical path difference functions (first and second optical path difference functions) are calculated as follows.

An optical path difference function represents a function as a diffraction lens in a form of an additional optical path length at a height h from the optical axis. More specifically, an i-th optical path difference function φi(h) can be expressed by an equation:

$$\phi_i(h) = (P_{i2}h^2 + P_{i4}h^4 + P_{i6}h^6 + P_{i8}h^8 + P_{i10}h^{10} + P_{i12}h^{12})m_i\lambda$$

where $P_{i2}$, $P_{i4}$, $P_{i6}$ ... (i: natural number) represent coefficients of the $2^{nd}$ order, $4^{th}$ order, $6^{th}$ order, ... of the i-th optical path difference function, h represents a height from the optical axis, $m_i$ represents a diffraction order at which the diffraction efficiency is maximized, and λ represents a design wavelength of a laser beam being used.

After the two types of optical path difference functions are calculated, the optical path difference functions are combined to determine the shape of the phase shift structure. By thus designing the phase shift structure with the two types of optical path difference functions, two types of step groups giving, to the first laser beam, optical path length differences different from each other can be obtained.

As described above, the condition (1) is provided to enhance mainly the use efficiency of light for the optical disc D3. Therefore, the first step group satisfying the condition (1) is configured to have a relatively large step size. For this reason, the first step group is not able to provide an effect of securing an adequate level of use efficiency of light for the information recording and the information reproducing for the optical disc D1. That is, the first step group may cause flare light to some extent.

Such flare light may decrease the SN ratio of a focus error signal depending on the convergence point thereof. Therefore, it is required to control the convergence point of the flare light so that the flare light does not badly affect the S/N ratio of the focus error signal. There is a possibility that the optical disc D1 having the multilayer structure which is generally employed to increase the storage capacity is used in the optical information recording/reproducing device 100. Therefore, control of the convergence point of the flare light is required to maintain the S/N ratio of the focus error signal at a high level even when the optical disc D1 having the multilayer structure is used.

In order to converge the flare light at a position not decreasing the S/N ratio of the focus error signal for both of the optical disc D1 having a single-layer structure and the optical disc D1 having the multilayer structure, the coefficient $P_{12}$ of the first optical path difference function defining the first step group is set to have a positive value. In this case, paraxial diffraction power takes a negative value. With this configuration, the flare light produced during use of the optical disc D1 converges at a position overlapping with a convergence point of the normal diffraction order light.

More specifically, the first step group is configured to satisfy the following condition (3):

$$0.0 < f1 \times P_{12} < 23.0 \quad (3)$$

where f1 represents a focal length of the objective lens 10 with respect to the first laser beam.

By defining the coefficient $P_{12}$ to satisfy the condition (3), it becomes possible to converge the flare light at a position not affecting badly the S/N ratio of the focus error signal even when the optical disc D1 having the multilayer structure is used. The following explanation focuses further on this point of view.

In the following, it is assumed that the multilayer structure of the optical disc D1 includes a first record layer and a second record layer arranged in this order from the light source side. When the coefficient $P_{12}$ satisfies the condition (3), the flare light converging for one of the first and second record layers does not converge at the position of the other of the first and second record layers. Therefore, when the condition (3) is satisfied, it is possible to effectively prevent the flare light converging for one of the first and second record layers from appearing as noise on the focus error signal.

However, if the coefficient $P_{12}$ of the first optical path difference function takes a positive value, the longitudinal chromatic aberration generated when the optical disc D1 is used becomes an undercorrected condition. For this reason, in this embodiment, the coefficient $P_{22}$ of the second optical path difference function defining the second step group is set to have a negative value so as to suitably correct the longitudinal spherical aberration caused by control of the focus position of the flare light.

More specifically, the second step group is configured such that the coefficient $P_{22}$ satisfies the following condition (4).

$$-35.0 \leq f1 \times P_{22} < 0.0 \quad (4)$$

If the intermediate value (f1×$P_{22}$) of the condition (4) gets lower than the lower limit of the condition (4), power of the phase shift structure for the first laser beam becomes too strong, and thereby the longitudinal spherical aberration becomes an overcorrected condition. If the intermediate value of the condition (4) gets larger than or equal to the upper limit of the condition (4) (i.e., if the coefficient $P_{22}$ takes a positive value), the function of correcting the longitudinal chromatic aberration does not work effectively.

In order to suitably correct the longitudinal chromatic aberration while achieving control of the focus position of the flare light, the coefficients $P_{12}$ and $P_{22}$ may be set to satisfy the following conditions (5) and (6).

$$-15.0 < f1 \times (m_1 \times P_{12} + m_2 \times P_{22}) < 30.0 \quad (5)$$

$$-10.0 < f1 \times (m_1 \times P_{12} + m_2 \times P_{22}) < 20.0 \quad (6)$$

By configuring the phase shift structure to satisfy the above described conditions, it is possible to suitably suppress the spherical aberration for each of the optical discs D1-D3 even if each of the first to third laser beams entering the objective lens 10 is used as the collimated beam. In addition, it is also possible to suitably suppress a coma or astigmatism caused during the tracking operation. Furthermore, it is possible to maintain the suitable focusing function while preventing occurrence of the flare light of the undesired diffraction order light when the optical disc D1 is used.

It is not necessarily required to form the above described phase shift structure on the entire surface 11 of the objective lens 10. The phase shift structure may be formed within an area (hereafter, referred to as a first area) which is defined in an inner part on the surface 11 including the optical axis and which contributes to convergence of the third laser beam. In other words, the first area is defined as an innermost area contributing to convergence of each of the first, second and third laser beams.

As described in detail below, the objective lens 10 is configured to have different structures depending on the position defined by the effective beam diameter for securing the NA required for the information recording and the information reproducing for each of the optical discs D1-D3. For example, the objective lens 10 may be configured to have a second area which is located outside the first area and has the phase shift structure different from the phase shift structure in the first area.

The phase shift structure in the second area is configured to suitably converge the first and second laser beams on the record surfaces 22 of the optical discs D1 and D2, respectively. It should be noted that each of the first and second laser beams are used respectively for the optical discs D1 and D2 which require higher numerical apertures than the numerical aperture for the optical disc D3.

The phase shift structure in the second area has steps not contributing to convergence of the third laser beam. That is, regarding the first laser beam, an absolute value of at least one of a plurality of types of optical path length differences given by the second area is different from an absolute value of an optical path length difference given by a particular step group in the first area. Regarding the first laser beam, if a plurality of types of step groups are defined in the first area, the particular step group in the first area corresponds to a step group giving an optical path length difference close to an even multiple of the wavelength of the first laser beam. For example, if two types of steps exist in the first area, the step group (i.e., the second step group) satisfying the condition (2) corresponds to the particular step group.

Figure 10:
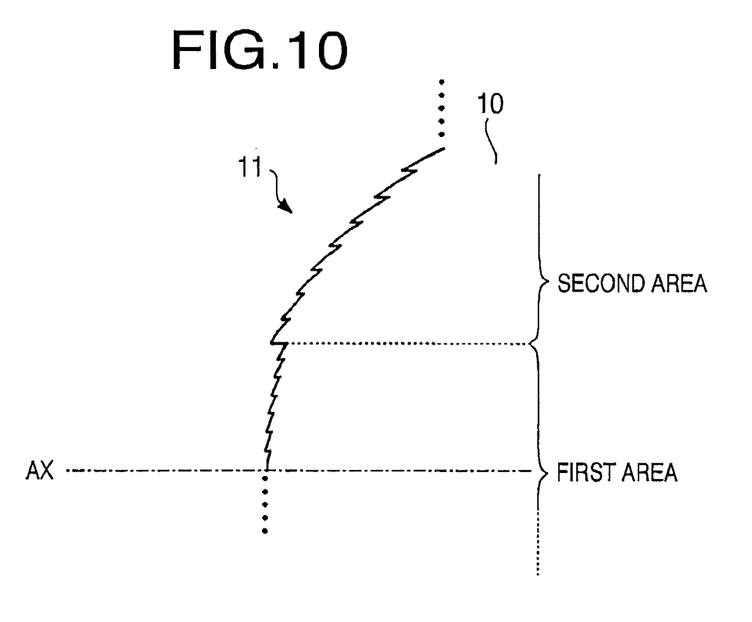
FIG. 10 is a cross sectional view of the objective lens illustrating the phase shift structure formed thereon.

FIG. 10 is a conceptual illustration of the phase shift structure formed on the surface 11 of the objective lens 10. That is, FIG. 10 is a cross sectional view of the objective lens 10 illustrating the phase shift structure formed on the surface 11 of the objective lens 10. In FIG. 10, the first and second areas are illustrated. Since FIG. 10 aims to provide a conceptual diagram of a phase shift structure, in FIG. 10 the phase shift structure is illustrated such that the first area is formed of a single type of step. However, as described above, the first area may include a plurality of types of steps.

In the following, three concrete examples of the optical information recording/reproducing device 100 employing the objective lens 10 are described. The optical block diagram of each of the following three examples is shown in FIG. 1.

In the following three examples, the aperture stop 60 shown in FIG. 2 is used to define the beam diameter so that the suitable numerical aperture for the information recording and the information reproducing for the optical disc D3 can be achieved. In the following three examples, the protective layer thicknesses of the optical discs D1, D2 and D3 are defined as follows.

D1=0.6 mm, D2=0.6 mm, D3=1.2 mm

FIRST EXAMPLE

The following Table 1 shows concrete specifications of the objective lens 10 according to a first example.

TABLE 1

|  | 1$^{st}$ laser beam | 2$^{nd}$ laser beam | 3$^{rd}$ laser beam |
| --- | --- | --- | --- |
| Wavelength (nm) | 406 | 660 | 788 |
| Focal Length (mm) | 2.0 | 2.08 | 2.09 |
| NA | 0.65 | 0.63 | 0.50 |
| Magnification M | 0.000 | 0.000 | 0.000 |

As indicated by the "Magnification M" in Table 1, the laser beam is incident upon the objective lens 10 as a collimated beam when each of the optical discs D1-D3 is used.

Table 2 shows a specific numerical configuration defined when the optical disc D1 is used in the optical information recording/reproducing device 100 provided with the objective lens 10 shown in Table 1. The following Table 3 shows a specific numerical configuration defined when the optical disc D2 is used in the optical information recording/reproducing device 100 provided with the objective lens 10 shown in Table 1. The following Table 4 shows a specific numerical configuration defined when the optical disc D3 is used in the optical information recording/reproducing device 100 provided with the objective lens 10 shown in Table 1.

TABLE 2

| Surface No. | r | d | n (406 nm) |  |
| --- | --- | --- | --- | --- |
| 1 (1$^{st}$ AREA) | 1.257 | 1.30 | 1.52454 | Objective Lens |
| 1 (2$^{nd}$ AREA) | 1.233 |  |  |  |
| 2 | −4.053 | 0.92 |  |  |
| 3 | ∞ | 0.60 | 1.62190 | Optical Disc D1 |
| 4 | ∞ | — |  |  |

TABLE 3

| Surface No. | r | d | n (660 nm) |  |
| --- | --- | --- | --- | --- |
| 1 (1$^{st}$ AREA) | 1.257 | 1.30 | 1.50635 | Objective Lens |
| 1 (2$^{nd}$ AREA) | 1.233 |  |  |  |
| 2 | −4.053 | 0.98 |  |  |
| 3 | ∞ | 0.60 | 1.57961 | Optical Disc D2 |
| 4 | ∞ | — |  |  |

TABLE 4

| Surface No. | r | d | n (788 nm) |  |
| --- | --- | --- | --- | --- |
| 1 (1$^{st}$ AREA) | 1.257 | 1.30 | 1.50316 | Objective Lens |
| 1 (2$^{nd}$ AREA) | 1.233 |  |  |  |
| 2 | −4.053 | 0.61 |  |  |
| 3 | ∞ | 1.20 | 1.57315 | Optical Disc D3 |
| 4 | ∞ | — |  |  |

In Tables 2-4 (and in the following similar Tables), "r" denotes the curvature radius (mm) of each optical surface, "d" denotes the thickness of an optical components or the distance (mm) from each optical surface to the next optical surface during the information reproduction/recordation, and "n (X nm)" represents a refractive index at the wavelength of X nm.

In the Tables 2-4, the surfaces #1 and #2 represent the surfaces 11 and 12 of the objective lens 10, respectively, and the surfaces #3 and #4 represent the protective layer and the record surface of the corresponding optical disc.

Each of the surfaces 11 and 12 (surfaces #1 and #2) of the objective lens 10 is an aspherical surface. The following Table 5 shows the cone constants K and aspherical coefficients $A_{2i}$ specifying the shape of each of the surfaces 11 and 12 (surfaces #1 and #2) of the objective lens 10. In Table 5 (and in the following similar Tables), the notation "E" means the power of 10 with an exponent specified by the number to the right of E (e.g. "E-04" means "$\times 10^{-4}$").

TABLE 5

| Surface No. | K | A4 | A6 | A8 | A10 | A12 |
| --- | --- | --- | --- | --- | --- | --- |
| 1 (1$^{st}$ AREA) | −0.6500 | −1.5890E−03 | −1.1710E−03 | −1.8550E−03 | −9.4810E−04 | −1.0548E−05 |
| 1 (2$^{nd}$ AREA) | −0.6500 | −1.9620E−02 | 8.8360E−03 | −1.6420E−03 | −1.0720E−03 | 2.4739E−05 |
| 2 | 0.0000 | 9.8310E−02 | −8.2110E−02 | 4.4800E−02 | −1.4210E−02 | 1.9827E−03 |

The surface 11 of the objective lens 10 has the first area including the optical axis and the second area located outside the first area. The first and second areas are defined by the height from the optical axis as indicated below.

First Area: $0.000 \leq h \leq 1.050$

Second Area: $1.050 < h \leq 1.300$

The first area is a common area contributing to convergence of each of the first to third laser beams. The second area contributes to convergence of each of the first and second laser beams but does not contribute to convergence of the third laser beam. In other words, the second area serves as an aperture stop for the third laser beam.

The first and second areas have functions different from each other. That is, each of the first and second areas has a unique phase shift structure. More specifically, each of the first and second areas has a phase shift structure defined by two types of optical path difference functions different from each other indicated below. The coefficient ($P_{i2}$, ...) and the diffraction order m defining the two types of optical path difference functions $\phi_i(h)$ of each of the first and second areas are shown in the following tables 6 and 7.

TABLE 6

| Surface No. | P2 | P4 | P6 | P8 | P10 | P12 |
|---|---|---|---|---|---|---|
| $1^{st}$ AREA (i = 1) | 4.3000E+00 | −4.4910E+00 | −1.4150E−01 | −4.4740E−01 | 0.0000E+00 | 0.0000E+00 |
| $1^{st}$ AREA (i = 2) | −6.0000E+00 | −2.4880E+00 | −1.2790E+00 | 8.4610E−02 | 0.0000E+00 | 0.0000E+00 |
| $2^{nd}$ AREA (i = 1) | 9.9350E+00 | −1.6910E+00 | 1.4890E+00 | −8.7825E−01 | 0.0000E+00 | 0.0000E+00 |
| $2^{nd}$ AREA (i = 2) | −3.7870E+00 | −7.2180E+00 | 1.6820E+00 | 0.0000E+00 | 0.0000E+00 | 0.0000E+00 |

TABLE 7

| Surface No. | $1^{ST}$ LASER BEAM | $2^{ND}$ LASER BEAM | $3^{RD}$ LASER BEAM |
|---|---|---|---|
| $1^{st}$ AREA (i = 1) | 3 | 2 | 2 |
| $1^{st}$ AREA (i = 2) | 2 | 1 | 1 |
| $2^{nd}$ AREA (i = 1) | 3 | 2 | 2 |
| $2^{nd}$ AREA (i = 2) | 5 | 3 | 3 |

SECOND EXAMPLE

The following Table 8 shows concrete specifications of the objective lens 10 according to a second example.

TABLE 8

| | $1^{st}$ laser beam | $2^{nd}$ laser beam | $3^{rd}$ laser beam |
|---|---|---|---|
| Wavelength (nm) | 406 | 660 | 788 |
| Focal Length (mm) | 2.00 | 2.07 | 2.08 |
| NA | 0.65 | 0.63 | 0.50 |
| Magnification M | 0.000 | 0.000 | 0.000 |

As indicated by the "Magnification M" in Table 1, the laser beam is incident upon the objective lens 10 as a collimated beam when each of the optical discs D1-D3 is used.

Table 9 shows a specific numerical configuration defined when the optical disc D1 is used in the optical information recording/reproducing device 100 provided with the objective lens 10 shown in Table 8. The following Table 10 shows a specific numerical configuration defined when the optical disc D2 is used in the optical information recording/reproducing device 100 provided with the objective lens 10 shown in Table 8. The following Table 11 shows a specific numerical configuration defined when the optical disc D3 is used in the optical information recording/reproducing device 100 provided with the objective lens 10 shown in Table 8.

TABLE 9

| Surface No. | r | d | n (406 nm) | |
|---|---|---|---|---|
| 1 ($1^{st}$ AREA) | 1.254 | 1.27 | 1.52454 | Objective Lens |
| 1 ($2^{nd}$ AREA) | 1.245 | | | |
| 2 | −4.164 | 0.93 | | |
| 3 | ∞ | 0.60 | 1.62190 | Optical Disc D1 |
| 4 | ∞ | — | | |

TABLE 10

| Surface No. | r | d | n (660 nm) | |
|---|---|---|---|---|
| 1 ($1^{st}$ AREA) | 1.254 | 1.27 | 1.50635 | Objective Lens |
| 1 ($2^{nd}$ AREA) | 1.245 | | | |
| 2 | −4.164 | 0.99 | | |
| 3 | ∞ | 0.60 | 1.57961 | Optical Disc D2 |
| 4 | ∞ | — | | |

TABLE 11

| Surface No. | r | d | n (788 nm) | |
|---|---|---|---|---|
| 1 ($1^{st}$ AREA) | 1.254 | 1.27 | 1.50316 | Objective Lens |
| 1 ($2^{nd}$ AREA) | 1.245 | | | |
| 2 | −4.164 | 0.61 | | |
| 3 | ∞ | 0.60 | 1.57315 | Optical Disc D3 |
| 4 | ∞ | — | | |

In the Tables 9-11, the surfaces #1 and #2 represent the surfaces 11 and 12 of the objective lens 10, respectively, and the surfaces #3 and #4 represent the protective layer and the record surface of the corresponding optical disc.

Each of the surfaces 11 and 12 (surfaces #1 and #2) of the objective lens 10 is an aspherical surface. The following Table 12 shows the cone constants K and aspherical coefficients $A_{2i}$ specifying the shape of each of the surfaces 11 and 12 (surfaces #1 and #2) of the objective lens 10.

TABLE 12

| Surface No. | K | A4 | A6 | A8 | A10 | A12 |
|---|---|---|---|---|---|---|
| 1 ($1^{st}$ AREA) | −0.6500 | −2.1190E−03 | −1.3400E−03 | −1.8080E−03 | −7.8010E−04 | −1.0069E−04 |
| 1 ($2^{nd}$ AREA) | −0.6500 | −1.5120E−02 | 8.3560E−03 | −7.3460E−04 | −1.2150E−03 | 3.2508E−05 |
| 2 | 0.0000 | 9.2310E−02 | −7.2430E−02 | 3.6580E−02 | −1.0710E−02 | 1.3799E−03 |

The surface 11 of the objective lens 10 has the first area including the optical axis and the second area located outside the first area. The first and second areas are defined by the height from the optical axis as indicated below.

First Area: $0.000 \leq h \leq 1.050$

Second Area: $1.050 < h \leq 1.300$

The first area is a common area contributing to convergence of each of the first to third laser beams. The second area contributes to convergence of each of the first and second laser beams but does not contribute to convergence of the third laser beam. In other words, the second area serves as an aperture stop for the third laser beam.

The first and second areas have functions different from each other. That is, each of the first and second areas has a unique phase shift structure. More specifically, each of the first and second areas has the phase shift structure defined by two types of optical path difference functions different from each other indicated below. The coefficient (Pi2, . . . ) and the diffraction order m defining the two types of optical path difference functions $\phi i(h)$ of each of the first and second areas are shown in the following tables 13 and 14.

TABLE 13

| Surface No. | P2 | P4 | P6 | P8 | P10 | P12 |
|---|---|---|---|---|---|---|
| $1^{st}$ AREA (i = 1) | 5.0000E−01 | −4.6530E+00 | −4.1200E−01 | −3.6430E−01 | 0.0000E+00 | 0.0000E+00 |
| $1^{st}$ AREA (i = 2) | −5.0000E−01 | −2.4550E+00 | −1.0520E+00 | 2.2600E−02 | 0.0000E+00 | 0.0000E+00 |
| $2^{nd}$ AREA (i = 1) | 8.2210E−01 | −2.1050E+00 | 9.8770E−01 | −7.2750E−01 | 0.0000E+00 | 0.0000E+00 |
| $2^{nd}$ AREA (i = 2) | 3.1180E−01 | −5.8560E+00 | 1.7830E+00 | 0.0000E+00 | 0.0000E+00 | 0.0000E+00 |

TABLE 14

| Surface No. | $1^{ST}$ LASER BEAM | $2^{ND}$ LASER BEAM | $3^{RD}$ LASER BEAM |
|---|---|---|---|
| $1^{st}$ AREA (i = 1) | 3 | 2 | 2 |
| $1^{st}$ AREA (i = 2) | 2 | 1 | 1 |
| $2^{nd}$ AREA (i = 1) | 3 | 2 | 2 |
| $2^{nd}$ AREA (i = 2) | 5 | 3 | 3 |

THIRD EXAMPLE

The following Table 15 shows concrete specifications of the objective lens 10 according to a third example.

TABLE 15

| | $1^{st}$ laser beam | $2^{nd}$ laser beam | $3^{rd}$ laser beam |
|---|---|---|---|
| Wavelength (nm) | 406 | 660 | 788 |
| Focal Length (mm) | 2.00 | 2.10 | 2.11 |
| NA | 0.65 | 0.62 | 0.50 |
| Magnification M | 0.000 | 0.000 | 0.000 |

As indicated by the "Magnification M" in Table 1, the laser beam is incident upon the objective lens 10 as a collimated beam when each of the optical discs D1-D3 is used.

Table 16 shows a specific numerical configuration defined when the optical disc D1 is used in the optical information recording/reproducing device 100 provided with the objective lens 10 shown in Table 15. The following Table 17 shows a specific numerical configuration defined when the optical disc D2 is used in the optical information recording/reproducing device 100 provided with the objective lens 10 shown in Table 15. The following Table 18 shows a specific numerical configuration defined when the optical disc D3 is used in the optical information recording/reproducing device 100 provided with the objective lens 10 shown in Table 15.

TABLE 16

| Surface No. | r | d | n (406 nm) | |
|---|---|---|---|---|
| 1 ($1^{st}$ AREA) | 1.260 | 1.32 | 1.52454 | Objective Lens |
| 1 ($2^{nd}$ AREA) | 1.255 | | | |
| 2 | −3.998 | 0.91 | | |
| 3 | ∞ | 0.60 | 1.62190 | Optical Disc D1 |
| 4 | ∞ | — | | |

TABLE 17

| Surface No. | r | d | n (660 nm) | |
|---|---|---|---|---|
| 1 ($1^{st}$ AREA) | 1.260 | 1.32 | 1.50635 | Objective Lens |
| 1 ($2^{nd}$ AREA) | 1.255 | | | |
| 2 | −3.998 | 0.99 | | |
| 3 | ∞ | 0.60 | 1.57961 | Optical Disc D2 |
| 4 | ∞ | — | | |

TABLE 18

| Surface No. | r | d | n (788 nm) | |
|---|---|---|---|---|
| 1 ($1^{st}$ AREA) | 1.260 | 1.32 | 1.50316 | Objective Lens |
| 1 ($2^{nd}$ AREA) | 1.255 | | | |
| 2 | −3.998 | 0.63 | | |
| 3 | ∞ | 0.60 | 1.57315 | Optical Disc D3 |
| 4 | ∞ | — | | |

In the Tables 16-18, the surfaces #1 and #2 represent the surfaces 11 and 12 of the objective lens 10, respectively, and the surfaces #3 and #4 represent the protective layer and the record surface of the corresponding optical disc.

Each of the surfaces 11 and 12 (surfaces #1 and #2) of the objective lens 10 is an aspherical surface. The following Table 19 shows the cone constants K and aspherical coefficients $A_{2i}$ specifying the shape of each of the surfaces 11 and 12 (surfaces #1 and #2) of the objective lens 10.

TABLE 19

| Surface No. | K | A4 | A6 | A8 | A10 | A12 |
|---|---|---|---|---|---|---|
| 1 ($1^{st}$ AREA) | −0.6500 | −7.8580E−04 | −9.7210E−04 | −1.9460E−03 | −9.1160E−04 | 2.3052E−05 |
| 1 ($2^{nd}$ AREA) | −0.6500 | −9.4880E−03 | 8.5020E−03 | −3.2980E−03 | −7.1740E−04 | −9.8391E−05 |
| 2 | 0.0000 | 1.0260E−01 | −9.0240E−02 | 5.2750E−02 | −1.8020E−02 | 2.6912E−03 |

The surface 11 of the objective lens 10 has the first area including the optical axis and the second area located outside the first area. The first and second areas are defined by the height from the optical axis as indicated below.

First Area: $0.000 \leq h \leq 1.050$

Second Area: $1.050 < h \leq 1.300$

The first area is a common area contributing to convergence of each of the first to third laser beams. The second area contributes to convergence of each of the first and second laser beams but does not contribute to convergence of the third laser beam. In other words, the second area serves as an aperture stop for the third laser beam.

The first and second areas have functions different from each other. That is, each of the first and second areas has a unique phase shift structure. More specifically, each of the first and second areas has the phase shift structure defined by two types of optical path difference functions different from each other indicated below. The coefficient (Pi2, . . . ) and the diffraction order m defining the two types of optical path difference functions φi(h) of each of the first and second areas are shown in the following tables 20 and 21.

TABLE 20

| Surface No. | P2 | P4 | P6 | P8 | P10 | P12 |
|---|---|---|---|---|---|---|
| 1st AREA (i = 1) | 1.1100E+01 | −4.1990E+00 | 2.6980E−01 | −5.4780E−01 | 0.0000E+00 | 0.0000E+00 |
| 1st AREA (i = 2) | −1.6500E+01 | −2.5710E+00 | −1.7740E+00 | 2.4970E−01 | 0.0000E+00 | 0.0000E+00 |
| 2nd AREA (i = 1) | 2.7510E+01 | −2.0480E+00 | 3.0070E+00 | −1.2990E+00 | 0.0000E+00 | 0.0000E+00 |
| 2nd AREA (i = 2) | −1.6040E+01 | −4.5340E+00 | 3.2170E−01 | 0.0000E+00 | 0.0000E+00 | 0.0000E+00 |

TABLE 21

| Surface No. | 1ST LASER BEAM | 2ND LASER BEAM | 3RD LASER BEAM |
|---|---|---|---|
| 1st AREA (i = 1) | 3 | 2 | 2 |
| 1st AREA (i = 2) | 2 | 1 | 1 |
| 2nd AREA (i = 1) | 3 | 2 | 2 |
| 2nd AREA (i = 2) | 5 | 3 | 3 |

Figure 3:
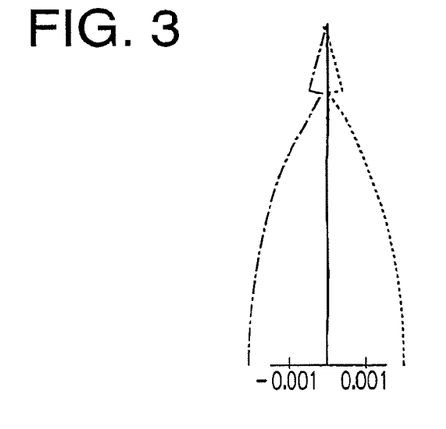
FIG. 3 is a graph illustrating the spherical aberration caused when an optical disc D1 having the highest recording density is used in the optical information recording/reproducing device according to a first example.
Figure 4:
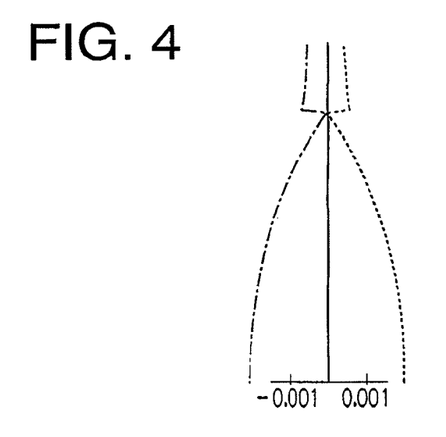
FIG. 4 is a graph illustrating the spherical aberration caused when the optical disc D1 is used in the optical information recording/reproducing device according to a second example.
Figure 5:
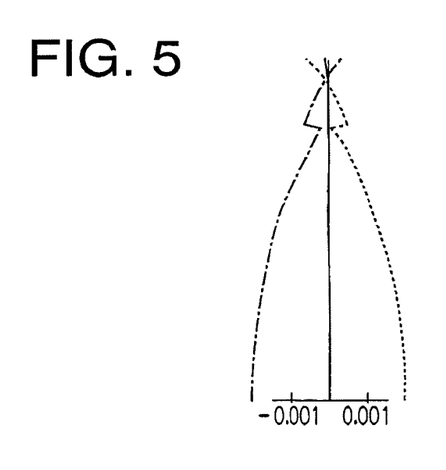
FIG. 5 is a graph illustrating the spherical aberration caused when the optical disc D1 is used in the optical information recording/reproducing device 100 according to a third example.

Hereafter, the optical performance of the first to third examples is described. The following Table 22 shows, for each of the first to third examples, values of the intermediate terms of the conditions (1) to (6). FIG. 3 is a graph illustrating the spherical aberration caused when the optical disc D1 is used in the optical information recording/reproducing device 100 according to the first example. FIG. 4 is a graph illustrating the spherical aberration caused when the optical disc D1 is used in the optical information recording/reproducing device 100 according to the second example. FIG. 5 is a graph illustrating the spherical aberration caused when the optical disc D1 is used in the optical information recording/reproducing device 100 according to the third example. In each of FIGS. 3-5, the curve indicated by a solid line represents the spherical aberration caused at the design wavelength of 407 mm, and the curve indicated by a dashed line represents the spherical aberration caused at the wavelength of 412 nm, and the curve indicated by a chain line represents the spherical aberration caused at the wavelength of 402 nm.

TABLE 22

| | 1ST EXAMPLE | 2ND EXAMPLE | 3RD EXAMPLE |
|---|---|---|---|
| CONDITION (1) | 3.25 | 3.36 | 3.15 |
| CONDITION (2) | 1.97 | 1.93 | 2.07 |

TABLE 22-continued

| | 1ST EXAMPLE | 2ND EXAMPLE | 3RD EXAMPLE |
|---|---|---|---|
| CONDITION (3) | 8.6 | 1.0 | 22.2 |
| CONDITION (4) | −12.0 | −1.0 | −33.0 |
| CONDITION (5) | 1.8 | 1.0 | 0.6 |
| CONDITION (6) | 1.8 | 1.0 | 0.6 |

As shown in Table 22, each of the first to third examples satisfies the conditions (1)-(6). Therefore, as shown in FIGS. 3-5, the spherical aberration is corrected extremely suitably for the design wavelength. In addition, each of the spherical aberration and the longitudinal chromatic aberration is suitably suppressed even when the wavelength of the laser beam slightly shifts from the design wavelength.

Figure 6:
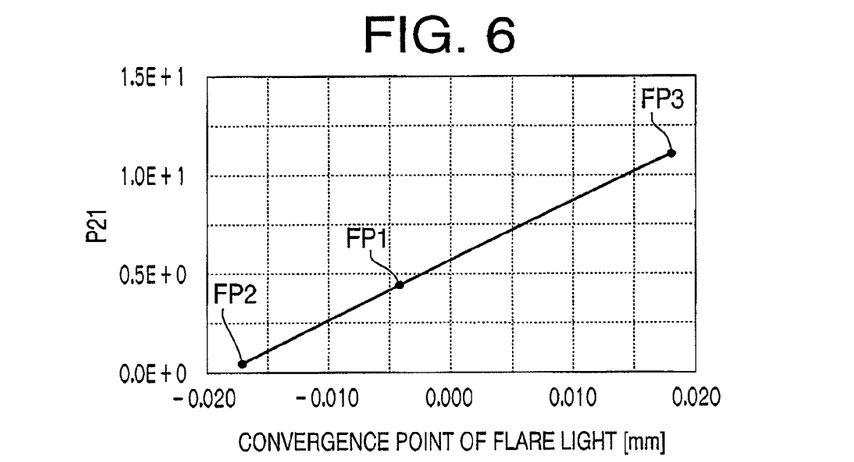
FIG. 6 is a graph illustrating a relationship between a focus position of flare light during use of the optical disc D1 and the coefficient $P_{12}$.

FIG. 6 is a graph illustrating a relationship between the convergence point of the flare light during use of the optical disc D1 and the coefficient $P_{12}$. The convergence point of flare light shown in FIG. 6 is defined with respect to the convergence point of the normal diffraction order light (i.e., the position of the record surface of the optical disc D1). Regarding the first example, a point FP1 represents the above described relationship defined in the first example, and the convergence point of flare light is −0.004 mm as shown in FIG. 6. Regarding the second example, a point FP2 represents the above described relationship defined in the second example, and the convergence point of flare light is −0.017 mm as shown in FIG. 6. Regarding the third example, a point FP3 represents the above described relationship defined in the third example, and the convergence point of flare light is 0.018 mm as shown in FIG. 6.

In general, an optical disc of the type having a multilayer structure for increasing the recording density (i.e., the optical disc D3 having the multilayer structure) is configured to have intervals of 20 μm to 40 μm between adjacent ones of the record layers. In this regard, it is understood that the convergence point of the flare light produced when the optical disc D1 is used is positioned between the adjacent ones of the record layers. That is, the flare light is converged at a potion not causing noise on the focus error signal.

Figure 7A:
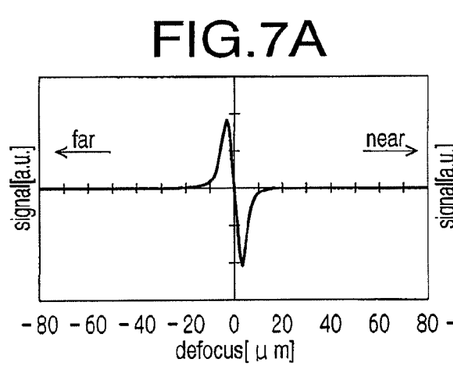
FIG. 7A shows a focus error signal during use of the optical disc D1 in the first example.
Figure 7B:
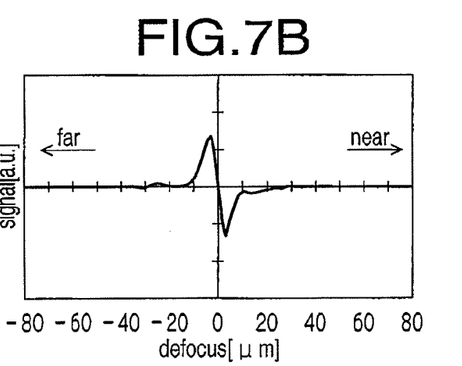
FIG. 7B shows the focus error signal during use of an optical disc D3 having the lowest recording density in the first example.
Figure 8A:
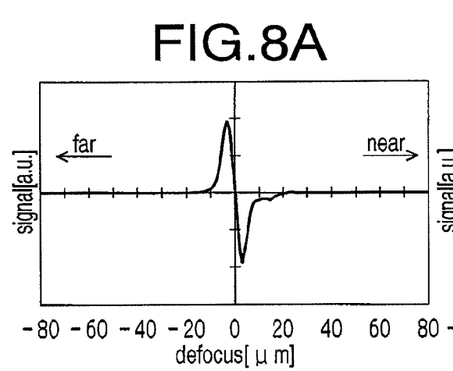
FIG. 8A shows the focus error signal during use of the optical disc D1 in the second example.
Figure 8B:
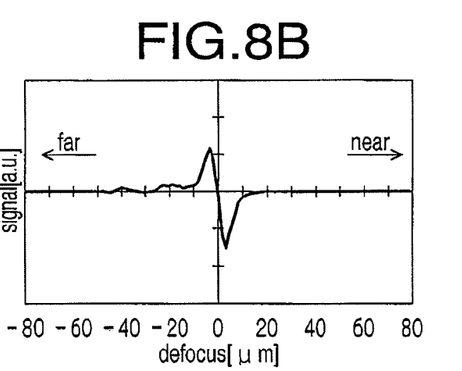
FIG. 8B shows the focus error signal during use of the optical disc D3 in the second example.
Figure 9A:
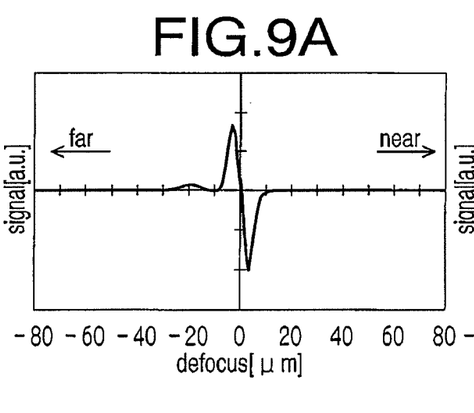
FIG. 9A shows the focus error signal during use of the optical disc D1 in the third example.
Figure 9B:
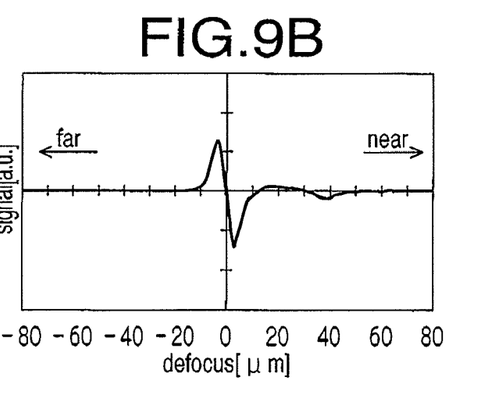
FIG. 9B shows the focus error signal during use of the optical disc D3 in the third example.

FIGS. 7A and 7B show focus error signals of the first example, FIGS. 8A and 8B show focus error signals of the second example, and FIGS. 9A and 9B show focus error signals of the third example. More specifically, FIG. 7A shows the focus error signal during use of the optical disc D1 in the first example, and FIG. 7B shows the focus error signal during use of the optical disc D3 in the first example. FIG. 8A shows the focus error signal during use of the optical disc D1 in the second example, and FIG. 8B shows the focus error signal during use of the optical disc D3 in the second example. FIG. 9A shows the focus error signal during use of the optical disc D1 in the third example, and FIG. 9B shows the focus error signal during use of the optical disc D3 in the third example.

Since the flare light is converged at the position between the adjacent record layers, each of the focus error signals shown in FIGS. 7A, 7B, 8A, 8B, 9A and 9B shows a suitable "S"-shaped curve formed by the normal diffraction order light. That is, each of the focus error signals of the first to third examples has a high S/N ratio.

Although the present invention has been described in considerable detail with reference to certain preferred embodiments thereof, other embodiments are possible.

The configuration of the objective lens 10 according to the embodiment is not limited to those shown in the first to third examples. The optical component (e.g., the objective optical system) provided in the optical information recording/reproducing device 100 may be formed of a plurality of optical elements. If the objective optical system is formed of a plurality of optical elements, an optical element designed in accordance with the above described embodiment may have the phase shift structures respectively on front and rear surfaces. That is, the objective lens 10 may have phase shift structures on both of the surfaces 11 and 12.

The difference between the NA for the optical disc D1 and the NA for the optical disc D2 may have a considerably large amount depending on the types of the employed standards. In other words, there is a case where the effective diameter of the first laser beam on the surface 11 of the objective lens 10 is different from the effective diameter of the second laser beam on the surface 11 of the objective lens 10. In such a case, a third area for securing a higher NA (i.e., a larger effective diameter) may be provided outside the second area.

For example, if the NA required for the optical disc D1 is larger than the NA required for the optical disc D2, the third are is configured to contribute to effectively converging only the first laser beam and not to contribute to convergence of the other types of laser beams.

This application claims priority of Japanese Patent Application No. P2007-320829, filed on Dec. 12, 2007. The entire subject matter of the application is incorporated herein by reference.

What is claimed is:

1. An objective lens used for an optical information recording/reproducing device for recording information to and/or reproducing information from three types of optical discs, by selectively using one of three types of light beams including a first light beam having a first wavelength $\lambda_1$, a second light beam having a second wavelength $\lambda_2$ and a third light beam having a third wavelength $\lambda_3$, the at least three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam, the first, second and third wavelengths $\lambda_1$, $\lambda_2$ and $\lambda_3$ satisfying a condition:

$$\lambda_1 < \lambda_2 < \lambda_3,$$

the objective lens comprising a first area contributing to converging the third light beam onto a record surface of the third optical disc, the first area including a phase shift structure having a plurality of refractive surface zones concentrically formed about a predetermined axis, the phase shift structure including a first step group and a second step group, wherein:

an optical path length difference given by the first step group to an incident light beam between adjacent refractive surface zones in the first step group is different from an optical path length difference given by the second step group to the incident light beam between adjacent refractive surface zones in the second step group;

positions of steps formed in the first and second step groups are defined by first and second optical path difference functions, respectively;

an i-th optical path difference function $\phi i(h)$ is expressed by:

$$\phi_i(h) = (P_{i2}h^2 + P_{i4}h^4 + P_{i6}h^6 + P_{i8}h^8 + P_{i10}h^{10} + P_{i12}h^{12})m_i\lambda$$

where $P_{i2}$, $P_{i4}$, $P_{i6}$ ... (i: natural number) respectively represent coefficients of the $2^{nd}$ order, $4^{th}$ order, $6^{th}$ order, ... of the i-th optical path difference function, h represents a height from an optical axis, $m_i$ represents a diffraction order at which diffraction efficiency is maximized, and $\lambda$ represents a design wavelength of the incident light beam;

the $2^{nd}$ order coefficient $P_{12}$ for a first optical path difference function $\phi_1(h)$ is a positive value;

the $2^{nd}$ order coefficient $P_{22}$ of a second optical path difference function $\phi_2(h)$ is a negative value;

the first step group is configured such that an optical path length difference $\Delta OPD_1$ given by each step of the first step group to the first light beam satisfies a following condition:

$$2N_1 + 1.10 < |\Delta OPD_1/\lambda 1| < 2N_1 + 1.40$$

where $N_1$ is a natural number or zero; and the second step group is configured such that an optical path length difference $\Delta OPD_2$ given by each step of the second step group to the first light beam satisfies a following condition:

$$2N_2 - 0.10 < |\Delta OPD_2/\lambda 1| < 2N_2 + 0.10$$

where $N_2$ is a natural number.

2. The objective lens according to claim 1, wherein the first step group is configured to satisfy a condition:

$$0.0 < f1 \times P_{12} < 23.0$$

wherein f1 represents a focal length of the objective lens with respect to the first light beam.

3. The objective lens according to claim 1, wherein the second step group is configured to satisfy a condition:

$$-35.0 \leq f1 \times P_{22} < 0.0.$$

4. The objective lens according to claim 1, wherein the objective lens satisfies a condition:

$$-15.0 < f1 \times (m_1 \times P_{12} + m_2 \times P_{22}) < 30.0.$$

5. The objective lens according to claim 4, wherein the objective lens satisfies a condition:

$$-10.0 < f1 \times (m1 \times P_{12} + m_2 \times P_{22}) < 20.0.$$

6. The objective lens according to claim 1, wherein N1=1 and N2=1 are satisfied.

7. An optical information recording/reproducing device for recording information to and/or reproducing information from three types of optical discs, by selectively using one of three types of light beams including a first light beam having a firs wavelength $\lambda_1$, a second light beam having a second wavelength $\lambda_2$ and a third light beam having a third wavelength $\lambda_3$, the at least three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam, the first, second and third wavelengths $\lambda_1$, $\lambda_2$ and $\lambda_3$ satisfying a following condition:

$$\lambda_1 < \lambda_2 < \lambda_3,$$

when numerical apertures required for information reproducing or information recording on the first, second and third optical discs are defined as NA1, NA2 and NA3, respectively, the numerical apertures satisfying following relationships:

$$(NA1 > NA3); \text{ and}$$

$$(NA2 > NA3),$$

when protective layer thicknesses of the first, second and third optical discs are represented by t1, t2 and t3, respectively, the protective layer thicknesses are t1≈0.6 mm, t2≈0.6 mm and t3≈1.2 mm, the optical information recording/reproducing device comprising:

light sources respectively emitting the first, second and third light beams; and an objective lens, the objective lens comprising a first area contributing to converging the third light beam onto a record surface of the third optical disc, the first area including a phase shift structure having a plurality of refractive surface zones concentrically formed about a predetermined axis, the phase shift structure including a first step group and a second step group, wherein:

an optical path length difference given by the first step group to an incident light beam between adjacent refractive surface zones in the first step group is different from an optical path length difference given by the second step group to the incident light beam between adjacent refractive surface zones in the second step group;

positions of steps formed in the first and second step groups are defined by first and second optical path difference functions, respectively;

an i-th optical path difference function $\phi_i(h)$ is expressed by:

$$\phi_i(h) = (P_{i2}h^2 + P_{i4}h^4 + P_{i6}h^6 + P_{i8}h^8 + P_{i10}h^{10} + P_{i12}h^{12})m_i\lambda$$

where $P_{i2}$, $P_{i4}$, $P_{i6}$ ... (i: natural number) represents coefficients of the $2^{nd}$ order, $4^{th}$ order, $6^{th}$ order, ... of the i-th optical path difference function, h represents a height from an optical axis, $m_i$ represents a diffraction order at which diffraction efficiency is maximized, and $\lambda$ represents a design wavelength of the incident light beam;

the $2^{nd}$ order coefficient $P_{12}$ for a first optical path difference function $\phi_1(h)$ is a positive value;

the $2^{nd}$ order coefficient $P_{22}$ of a second optical path difference function $\phi_2(h)$ is a negative value;

the first step group is configured such that an optical path length difference $\Delta OPD_1$ given by each step of the first step group to the first light beam satisfies a condition:

$$2N_1 + 1.10 < |\Delta OPD_1/\lambda 1| < 2N_1 + 1.40$$

where $N_1$ is a natural number or zero;

the second step group is configured such that an optical path length difference $\Delta OPD_2$ given by each step of the second step group to the first light beam satisfies a following condition:

$$2N_2 - 0.10 < |\Delta OPD_2/\lambda 1| < 2N_2 + 0.10$$

where $N_2$ is a natural number; and each of the first, second and third light beams is incident on the objective lens as a collimated beam.

8. The optical information recording/reproducing device according to claim 7, wherein the first step group of the objective lens is configured to satisfy a condition:

$$0.0 < f1 \times P_{12} < 23.0$$

wherein f1 represents a focal length of the objective lens with respect to the first light beam.

9. The optical information recording/reproducing device according to claim 7, wherein the second step group of the objective lens is configured to satisfy a condition:

$$-35.0 \leq f1 \times P_{22} < 0.0.$$

10. The optical information recording/reproducing device according to claim 7, wherein the objective lens satisfies a condition:

$$-15.0 < f1 \times (m_1 \times P_{12} + m_2 \times P_{22}) < 30.0.$$

11. The optical information recording/reproducing device according to claim 10, wherein the objective lens satisfies a condition:

$$-10.0 < f1 \times (m_1 \times P_{12} + m_2 \times P_{22}) < 20.0.$$

12. The optical information recording/reproducing device according to claim 7, wherein N1=1 and N2=1 are satisfied.

13. The optical information recording/reproducing device according to claim 7, wherein:

the objective lens includes a second area located outside the first area; and the second area contributes to converging the first and second light beams onto recording surfaces of the first and second optical discs, respectively, and does not contribute to converging the third light beam onto the recording surface of the third optical disc.

* * * * *